Feb. 16, 1954 C. J. SWANK 2,669,042
DRAG SCOOP FOR HANDLING RIPRAP
Filed March 20, 1951 3 Sheets-Sheet 2
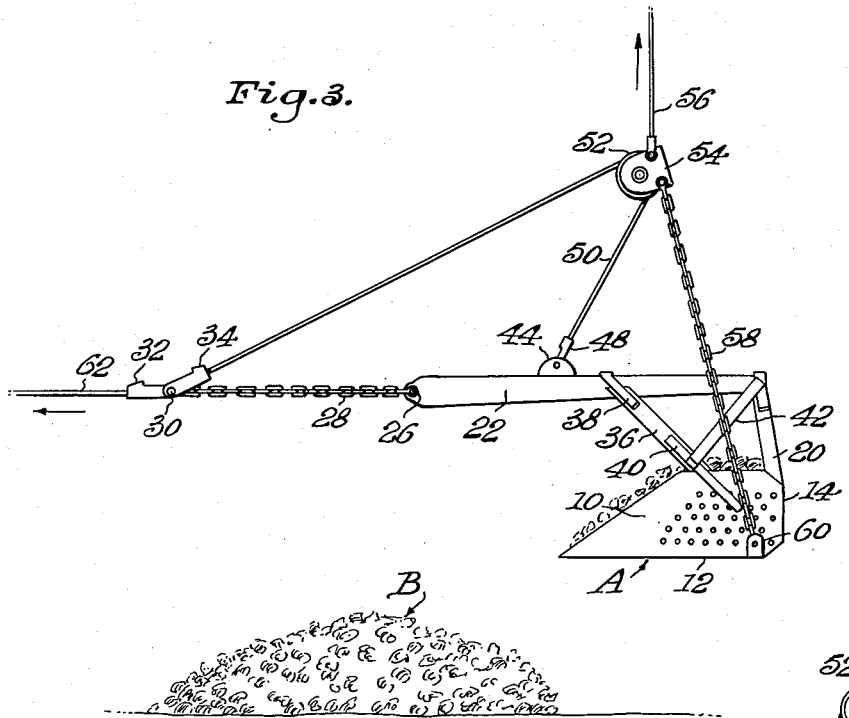
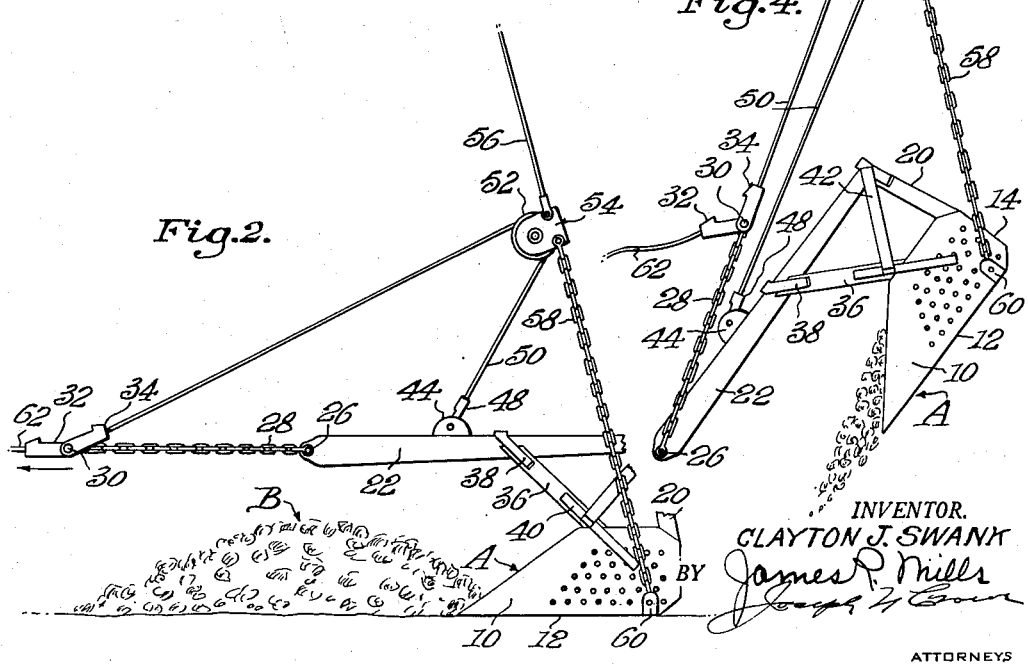
INVENTOR.
CLAYTON J. SWANK
ATTORNEYS

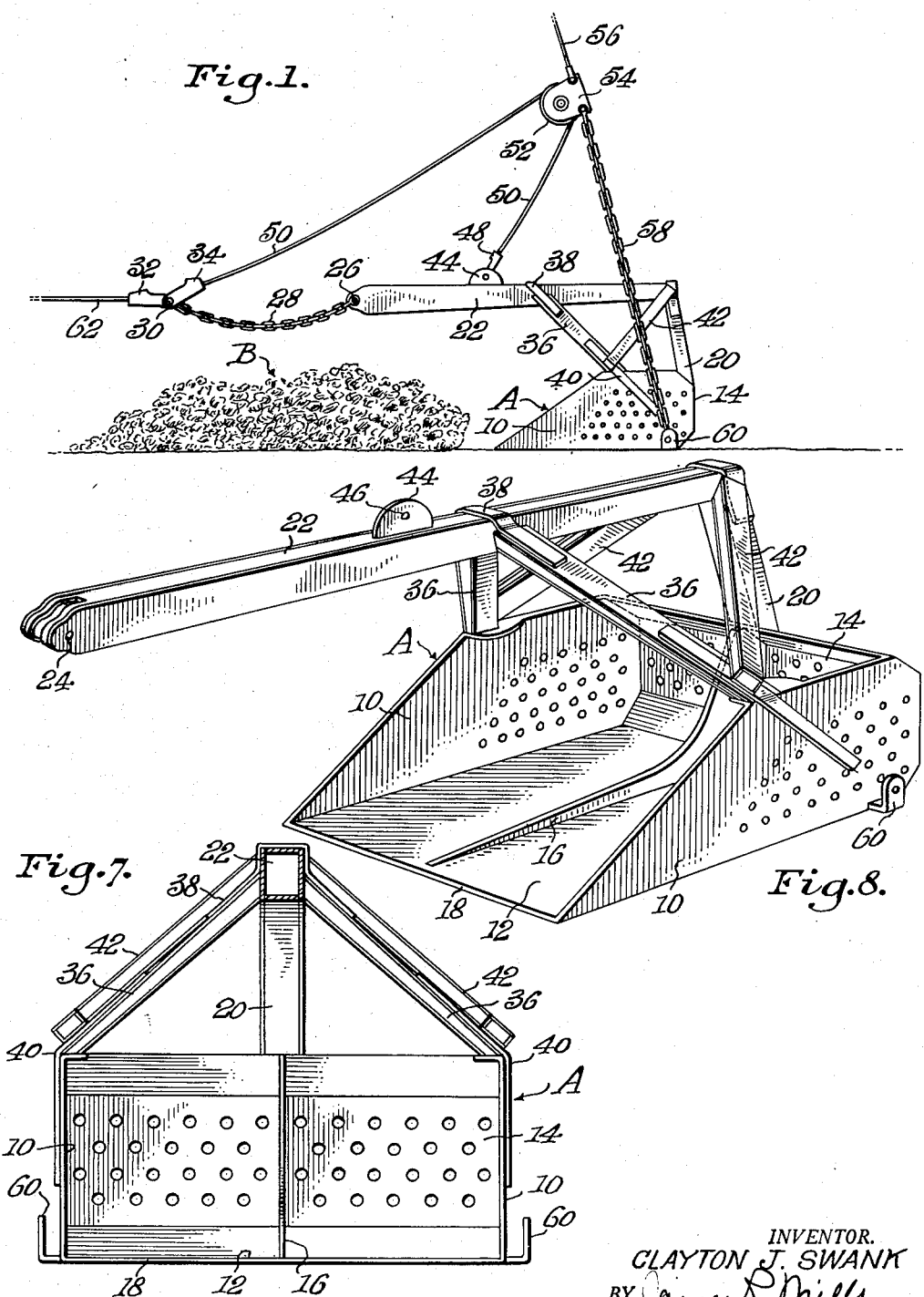

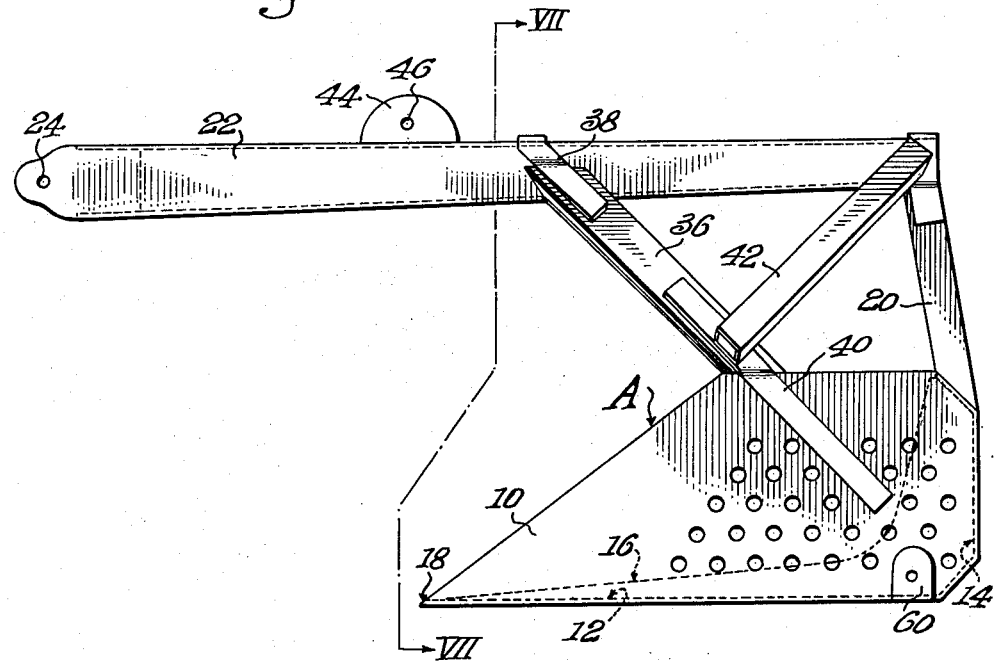
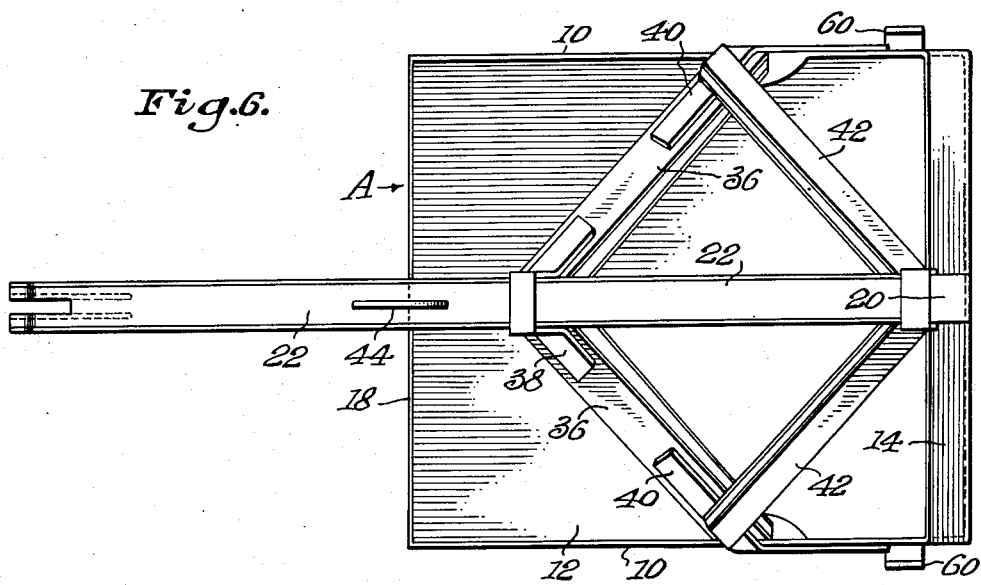

Patented Feb. 16, 1954

2,669,042

UNITED STATES PATENT OFFICE 2,669,042

DRAG SCOOP FOR HANDLING RIPRAP

Clayton J. Swank, Greenville, Miss.

Application March 20, 1951, Serial No. 216,645

3 Claims. (Cl. 37—115)

(Granted under Title 35, U. S. Code (1952), sec. 266)

The invention described herein may be manufactured and used by or for the Government for governmental purposes, without payment to me of any royalty thereon.

The present invention relates to improved material handling equipment for loose materials of irregular shapes; and, more specifically, the invention provides an improved construction and mounting of a drag scoop for handling broken stone, such as riprap stone or other similar hard objects of irregular shapes.

In the handling of such materials, difficulties are encountered in obtaining clean pick-ups of the materials by conventional material handling equipment, and also in expeditiously discharging the picked-up material at the desired dumping point or site, such materials being usually of considerable weight, the weight and irregular shapes thereof inhibiting entry of the equipment into piles or other masses of the material, and causing the scoop of the equipment to slide over the materials instead of entering the piles thereof.

The present invention has for one of its objects the provision of an improved drag scoop for handling broken stone or similar materials, and the provision of improved suspension means whereby the scoop may be operated from any standard crane.

A still further object of the invention is to provide improved means for moving stone or other similar materials from a loading site to an exact position where such materials are desired to be placed, as in the unloading of stone from barges or railroad cars and placing the same in trucks, or some other desired and exact spot on the ground or on a river bank.

Further objects of the invention are to provide an improved suspension system for a scoop-bucket, wherein all cables and chains are away from the loading edge of the scoop, thus assuring obstruction-free loading of the stone into the scoop, and the provision of a smooth straight lip on the loading edge of the scoop, which lip is free from teeth or any similar devices, so that the scoop will slide readily between and into a pile of loose stone or similar materials and a smooth surface, such as the deck of a barge or the ground, upon which the materials have been placed.

The improved construction of the present invention embodies an all-welded scoop bucket for the handling of riprap stone, which is stone that is broken into fragments of irregular sizes and shapes, and which usually is employed in protective revetment constructions for inhibiting erosion of river banks or generally similar terrain by the action of water, wind, or other erosive influences. The scoop of the present invention is adapted to be operated from any standard crane having two drums, one for a drag line and one for a hoist line.

The invention also includes an improved suspension system for the scoop, whereby the scoop is suspended from the crane in a manner which causes the scoop to "bite" into a rock pile during loading and, after loading of the scoop, causes the same to be positioned horizontally during lifting and during transport of the loaded scoop from the pile to dumping location, and which, finally, permits the scoop to be dumped accurately at the desired location for dumping.

Further objects of the invention will become apparent as the description proceeds, and the features of novelty will be pointed out in particularity in the appended claims.

The invention will be understood more readily from a consideration of the accompanying drawings, in which:

Fig. 1 is a side elevation of the improved scoop and suspension means, showing the position of the latter when the scoop is on the ground and approaching a rock pile for filling the scoop;

Fig. 2 is a similar view, showing the scoop entering the rock pile at the start of the filling operation;

Fig. 3 is a similar view but showing the filled scoop raised from the rock pile and in transporting position;

Fig. 4 is a similar view showing the position of the scoop and suspension means during dumping of the scoop;

Fig. 5 is an enlarged side elevation of the scoop;

Fig. 6 is a plan view of the scoop;

Fig. 7 is a sectional elevation taken on the line VII—VII of Fig. 5; and

Fig. 8 is a perspective view of the scoop.

Referring more particularly to the drawings, reference character A represents the body of the improved scoop having sides 10, a bottom 12, back 14, and longitudinally extending reinforcing rib 16, which extends from a point adjacent to the lip of the scoop to the top of the back thereof. The scoop, being of all-welded steel construction, has the parts thereof integrally bonded together, so that the scoop actually is of unitary construction. As will be seen from the drawings, the scoop A is open, and has a smooth, straight, hardened-steel loading lip 18, the loading ends of the sides 10 tapering downwardly to this lip for reducing resistance against entry of the lip 18 under a rock pile B. The bottom 12 is made in one piece of plate steel, the gage of which may be reduced by the provision of the reinforcing rib 16, which rib prevents any tendency of the bottom to warp under the weight of the load.

Welded to the mid-portion of the back 14 is an upwardly extending column-beam 20, to the upper end of which is welded the forwardly projecting overhead plow beam 22, the top and bottom of which diverge towards the free end of the said plow-beam, the plow-beam 22 sloping towards the lip 18 of the scoop A. The free end of the plow-beam 22 is provided with an eye 24 adapted to receive a pin 26 which serves as a connection for a drag chain or cable 28 the other end of which is connected to pivot pin 30 of a three-way drag hook which comprises arms 32 and 34 which are pivotally interconnected by the pivot pin 30. The plow-beam 22 is braced by forwardly extending braces 36, which are welded to the plow-beam 22 and to the sides 10 of the scoop A, the weld unions being effectively reinforced by the straps 38 and 40, welded respectively to the braces 36 and to the sides 10 of the scoop. The plow-beam 22 also is braced by the rearwardly extended diagonal braces 42 which are welded to straps 40 and to the plow-beam 22 at its juncture with the upwardly extending rear column-beam 20. The plow-beam 22 and the various braces therefor preferably are constructed as rectangular box sections built up of plates of structural steel, thus giving strength with maximum possible reduction in weight.

The overhead plow-beam 22 also has welded to the top thereof an upstanding bracket 44 having an eye 46 therein for receiving a connector 48 for one end of a stabilizing cable 50, this cable passing around an overhead pulley sheave 52 which rotates in pulley block 54, the other end of cable 50 being connected in the arm 34 of the three-way drag hook. The pulley block 54 has connected to it a hoist line 58 of an operating crane (not shown) and also has connected to it a pair of hoist chains 58 that also are connected to the side brackets 60 that are welded to the bottoms of the sides 10 of the scoop A, adjacent to the rear of the scoop. The arm 32 of the three-way drag hook is attached to the dragline 62 from the operating crane.

In operating the improved scoop of the present invention, the crane is placed in such a position as to reach both the stone or other material to be placed, and the site upon which the stone is to be placed. The scoop is placed on the opposite side of the pile of stone to be moved by the crane, using the hoist line 56 and hoist chain 58. When the scoop is in position on a flat surface (such as the ground, or deck of a barge or the like), the drag line drum on the crane is operated to pull on the dragline 62, this pull being transmitted directly and rectilinearly to the overhead plow-beam 22 through the drag chain 28, the slack in which is taken out, as indicated in Fig. 2. The forward slope of the overhead plow-beam 22 causes the scoop to tend to tilt forwardly so as to permit the lip 18 to enter the stone pile B efficiently to fill the scoop without any appreciable tendency of the scoop to ride upwardly over the stone pile B, the scoop entering the pile B intermediate the said pile and the flat surface upon which it is resting. It will be observed that the overhead plow-beam 22 allows the scoop to be pulled from a point above the scoop, thus providing enough clearance between the drag mechanism and loading lip of the scoop to clear the top of the stone pile, giving an unobstructed entrance of the stone to the bucket. The wide flat bottom of the scoop and straight loading edge allow the scoop to ride evenly on a flat surface and slide easily under loose stone or other material.

When the scoop is filled, the hoist line 56 is raised while the drag line is maintained taut. The lifting movement is transmitted to the scoop through hoist chains 58. As the scoop is lifted clear of the pile B, the tension on the drag line 62 and drag chain 28, coupled with the lifting action of cable 50 on the plow-beam 22, firmly holds the scoop in horizontal non-dumping position until it is swung to a point directly above the site where the stone is to be placed. The cable 50 stabilizes the scoop in the horizontal position, it overcoming the normally unbalanced condition of the scoop arising from the forward projection of the plow-beam 22 and also to the rearward attachment of the hoist chains 58. This unbalanced condition allows the bucket to overturn forwardly as shown in Fig. 4, responsively to release of the drag cable 62.

As is indicated by the foregoing, in the suspension system of the present scoop, the slack on cable 50, when the scoop is resting on the ground or other flat surface preparatory to loading, is proportioned to the slack in the drag chain 28, so that when the latter becomes taut incident to the rectilinear pull thereon as the scoop is being dragged into the stone pile B for filling the scoop, the slack in the cable 50 also will be taken up. However, there is no substantial tension imparted to the cable 50 during the filling of the scoop, the cable not acting to effect an appreciable lifting action on the lip 18 of the scoop. When the scoop is dumped, the cable 50 acts as a stop for the downward swinging of the scoop, as will be apparent from Fig. 4, the force of the dumping movement being transmitted from the free end of the plow-beam 22 through the drag chain 28, and arm 34 of the drag hook to the cable 50.

It will be seen from the foregoing that in the present construction all cables and chains are away from the loading edge of the scoop, thus accomplishing obstruction-free loading of the stone into the scoop. The smooth straight lip 18 on the loading edge of the scoop readily slides between a pile of loose stone or similar materials and a flat surface, such as the deck of a barge or the ground, thus affording a maximum load of the material to be handled with a minimum amount of work. As will be seen from the drawings, the drag line 62 of the crane, of which the drag chain 28 is an operating part, is attached well above the centroid of the scoop through the overhead plow-beam 22, which is braced by the two braces 36 which are connected and welded to the overhead plow-beam by the straps 38 at their tops and to the sides of the bucket by straps 40 at their bottom ends, the plow-beam 22 being further braced by two braces 42 which are welded to the overhead plow-beam 22 at their tops and to the braces 36 at their bottoms. The column-beam 20 is welded at its top to the overhead plow-beam 22 and at its bottom to the top of the scoop on the vertical center line of the back plate of the scoop. The plow-beam 22 acts on the scoop like a plow beam, and may be so considered.

This system provides a leverage on the scoop that causes the loading lip 18 of the scoop to exert a pressure on the surface upon which the scoop is pulled so that the scoop readily penetrates the stone pile, thus preventing the loading edge of the scoop from riding up and over the stone, as is the case with a conventional drag bucket when handling stone or similar irregular and incompressible objects. The above-described brace structure for the scoop defines rigid triangular reinforcing truss means disposed laterally on the scoop externally thereof and provides unobstructed rectilinear entry of the scoop into the pile of rock being moved.

Having thus described my invention, what I claim as new and wish to secure by Letters Patent is:

1. A drag scoop for moving massive broken rock such as riprap rock from a pile thereof resting on a substantially flat surface, the said scoop being adapted to be actuated by operating mechanism provided with retracting and hoisting means for a load, which drag scoop comprises a scoop body having a substantially flat bottom terminating forwardly in a continuously smooth, uniform, and unobstructed loading lip and having also an uninterrupted, smooth, and flat underside surface, opposite side walls integral with the bottom and extending upwardly therefrom, a rear wall connecting the side walls and integral therewith and with the bottom of the scoop, a column-beam on the rear wall projecting upwardly therefrom and integral therewith, a plow-beam secured at an end to the said column-beam at a substantial distance above the scoop for providing substantial clearance above a pile of rock to be moved and maintaining unobstructed the lip and interior of the scoop, the plow-beam projecting forwardly above the scoop a substantial distance in advance beyond the loading lip and parallel to the flat bottom of the scoop, the said plow-beam having a free end opposite to the end secured to the column-beam and having a mass sufficient to continuously unbalance the scoop forwardly on the lip for causing the lip and scoop to enter into the pile of riprap rock being moved between the pile and the flat surface on which the pile is resting, a drag hook connected to the scoop, a drag cable interconnecting the free end of the plow-beam to the drag hook and adapted to impart a straight-line pull on the plow-beam, a drag line interconnecting the drag hook and operating mechanism, and suspension means for suspending the scoop from the operating mechanism including a pulley sheave, a pulley block housing the pulley sheave, flexible lifting means pivotally connected to the scoop rearwardly thereof and adjacent to the bottom of the scoop, the lifting means being also connected to the pulley block, a hoist line interconnecting the pulley block to the operating mechanism, and a stabilizing line connected to the plow-beam and to the drag hook and passing over the pulley sheave for maintaining the scoop horizontal while suspended between loading and dumping positions and also between dumping and loading positions, the said stabilizing line having a slack therein proportional to slack in the drag cable between the plow-beam and drag hook so that when the latter becomes taut incident to a rectilinear pull thereon as the scoop is pulled by the drag cable and drag line into the rock pile for filling the scoop, the slack in the stabilizing line also is taken up while avoiding appreciable tension on the stabilizing line for preventing lifting action on the loading lip of the scoop by the stabilizing line during filling of the scoop, the aforesaid suspension means being attached to the scoop and to the operating mechanism for imparting only substantially rectilinear movements to the scoop throughout its cycle of loading and dumping.

2. A drag scoop structure as claimed in claim 1, further comprising forwardly projecting reinforcing bars secured to rear portions of the scoop on exterior surfaces of the side walls and to the plow-beam and additional reinforcing bars interconnecting the aforesaid bars and the column-beam on the rear wall of the scoop at approximately the juncture of the plow-beam and column-beam and defining with the aforesaid bars and column-beam rigid triangular reinforcing truss means disposed laterally on the scoop exteriorly thereof and providing unobstructed rectilinear entry of the scoop into the pile of rock being moved.

3. A drag scoop structure as claimed in claim 1, wherein the plow-beam progressively increases in width from the said column-beam to its free end and maintains the scoop normally forwardly unbalanced, the scoop being self-overturning forwardly at discharging position responsively to release of the drag cable, the stabilizing line then defining a stop for downward swinging movement of the scoop at discharging position while overcoming the normal forward unbalance of the scoop and maintaining the scoop horizontal during its suspended movement between loading and discharging positions, the weight of the load in the loaded scoop being carried substantially entirely by the flat bottom of the scoop while the scoop is freely suspended from the suspension means.

CLAYTON J. SWANK.

References Cited in the file of this patent

UNITED STATES PATENTS

| Number | Name | Date |
|---|---|---|
| 1,714,120 | Bailey, Jr. | May 21, 1929 |
| 1,752,510 | Shnable | Apr. 1, 1930 |
| 2,525,528 | Deal | Oct. 10, 1950 |
| 2,609,621 | Babin | Sept. 2, 1952 |

FOREIGN PATENTS

| Number | Country | Date |
|---|---|---|
| 545 of 1912 | Great Britain | Aug. 29, 1912 |
| 550,158 | Great Britain | Dec. 24, 1942 |